United States Patent
Wells

(10) Patent No.: US 8,613,244 B2
(45) Date of Patent: Dec. 24, 2013

(54) METHOD FOR THE PRODUCTION OF TEA BEVERAGES AND OTHER BEVERAGES

(75) Inventor: John E. Wells, Oviedo, FL (US)

(73) Assignee: IBS Interbev, Inc, Orlando, FL (US)

( * ) Notice: Subject to any disclaimer, the term of this patent is extended or adjusted under 35 U.S.C. 154(b) by 995 days.

(21) Appl. No.: 12/584,399

(22) Filed: Sep. 4, 2009

(65) Prior Publication Data

US 2011/0008504 A1      Jan. 13, 2011

Related U.S. Application Data

(60) Provisional application No. 61/224,818, filed on Jul. 10, 2009.

(51) Int. Cl.
*A47J 31/58* (2006.01)
(52) U.S. Cl.
USPC .................. 99/280; 99/288; 99/289; 99/290; 99/302 R; 99/323.3; 99/279
(58) Field of Classification Search
USPC ...................... 99/289, 290, 302 R, 323.3, 279
See application file for complete search history.

(56) References Cited

U.S. PATENT DOCUMENTS

| | | | | |
|---|---|---|---|---|
| 2,420,615 | A * | 5/1947 | Palmer et al. | 426/434 |
| 3,001,557 | A * | 9/1961 | Kuckens | 141/94 |
| 3,113,655 | A * | 12/1963 | Adler | 194/244 |
| 3,651,918 | A * | 3/1972 | Herzog | 198/519 |
| 4,757,752 | A * | 7/1988 | Robins et al. | 99/279 |
| 5,087,469 | A * | 2/1992 | Acree | 426/544 |
| 6,120,825 | A * | 9/2000 | Cirigliano et al. | 426/435 |
| 6,231,907 | B1 * | 5/2001 | Kino et al. | 426/131 |
| 6,602,538 | B1 * | 8/2003 | Watkins et al. | 426/594 |
| 6,962,104 | B1 * | 11/2005 | Podlucky et al. | 99/300 |
| 7,231,142 | B1 * | 6/2007 | Leung et al. | 392/441 |
| 7,980,170 | B2 * | 7/2011 | Paloheimo | 99/290 |
| 8,069,775 | B2 * | 12/2011 | Russo | 99/303 |
| 2008/0095904 | A1 * | 4/2008 | Sullivan et al. | 426/431 |
| 2009/0246341 | A1 * | 10/2009 | Pitner et al. | 426/435 |
| 2010/0034943 | A1 * | 2/2010 | Kirschner | 426/435 |

* cited by examiner

*Primary Examiner* — Anthony Weier

(57) ABSTRACT

A beverage concentrate system (10) includes a brewer (12), a heat exchanger (24) and pump (22). Beverage concentrate is pumped by pump (22) from a receptacle (14), and through the heat exchanger (24), for combining with water via a dispenser (28) to form a finished beverage.

12 Claims, 2 Drawing Sheets

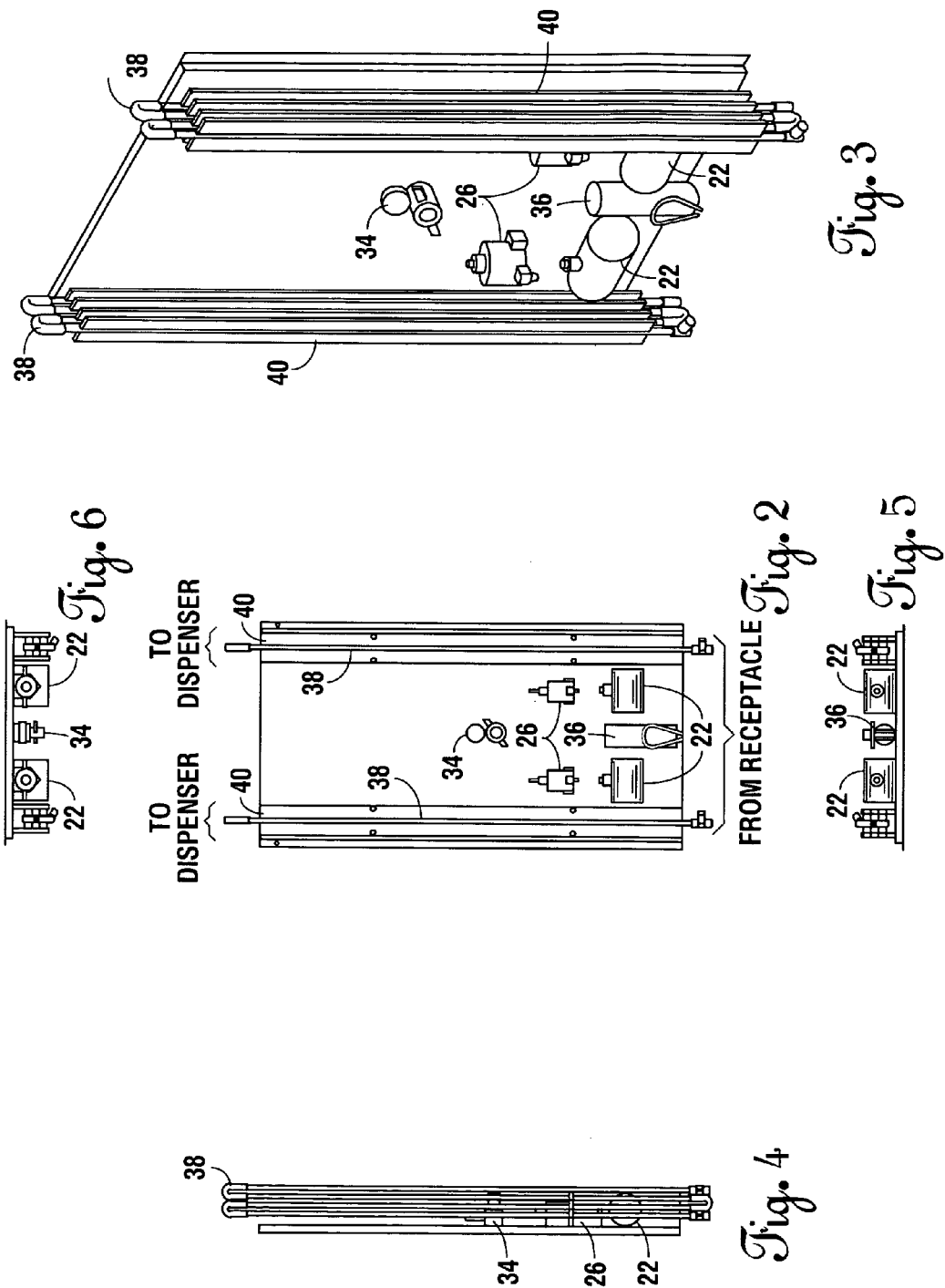

US 8,613,244 B2

METHOD FOR THE PRODUCTION OF TEA BEVERAGES AND OTHER BEVERAGES

CROSS-REFERENCE TO RELATED APPLICATION AND PRIORITY INFORMATION

This application claims the benefit of prior filed U.S. provisional application no. 61/224,818, entitled "Tea brewing/dispensing system and machine", filed Jul. 10, 2009 (EFS ID No. 5683822).

TECHNICAL FIELD OF THE INVENTION

This invention relates generally to beverage technology, and more particularly to methods and apparatus for the production of tea beverages and other beverages.

BACKGROUND OF THE INVENTION

Tea beverages are most often produced either by brewing the tea in ready to drink proportions, or by mixing a tea concentrate with water.

For tea beverages made from tea concentrates, two processes are generally used. In one process, the concentrate is produced at one facility and shipped to another (such as a restaurant or convenience store) for diluting with water and dispensing at finished-beverage strength.

In the second process, tea concentrate is produced locally at the dispensing site, and diluted with water (to form finished-beverage strength tea) either at the time of brewing, or shortly thereafter, for example in a tea urn. In these locally-produced-concentrate processes, the diluent water is mixed with the concentrate before the time of dispensing, and the finished-beverage strength tea is held in a container for dispensing.

Each of these concentrate processes has several drawbacks. For example, the first suffers from lack of freshness and high shipping costs, among others. The second suffers from a short shelf life (due to souring from mixing with cold water or otherwise non-aseptic handling) and from low output capacity, among others. Also, brewing at ready to drink proportions suffers from similar problems to those of existing locally-produced-concentrate processes, among others.

Therefore, a need has arisen for an improved tea beverage production system and method for production of tea beverages, and which also may be used to produce other beverages, such as, without limitation, coffee beverages.

SUMMARY OF THE INVENTION

In accordance with the teachings of the present invention, methods and apparatus for the production of tea beverages and other beverages are provided which eliminate or substantially reduce problems associated with prior art systems.

In one aspect of the present invention a beverage production system is provided at a single facility, and includes a brewer operable to brew a beverage concentrate, a heat exchanger, a pump operable to pump brewed beverage concentrate through the heat exchanger, and a dispenser operable to dispense the beverage concentrate that has been pumped through the heat exchanger and water to form a finished beverage.

In a particular embodiment of the system, a receptacle is also provided for receiving the beverage concentrate. The receptacle may be upstream or downstream of the heat exchanger. In another particular embodiment, a hermetic seal is provided for hermetically sealing the receptacle after receiving the beverage concentrate. Also, in another embodiment, a sensor operable to sense the presence of the receptacle is provided, along with circuitry operable to disable the brewer in response to the sensor not sensing the presence of the receptacle.

In a particular embodiment, the brewer brews the beverage concentrate at a temperature of at least about 180° F. In another embodiment, the heat exchanger reduces the temperature of the beverage concentrate to less than about 120° F. In another embodiment, the pump is coupled between the dispenser and the heat exchanger.

In another embodiment, the system may include a sensor operable to sense an out of product condition with respect to the beverage concentrate correspondingly cause the pump to be disabled.

In still other embodiments, the system may include a sweetener injector operable to add sweetener to the beverage concentrate or a flavor injector operable to add flavor to the beverage concentrate.

A method of producing beverage is also provided, which includes brewing a beverage concentrate, flowing the beverage concentrate through a heat exchanger, and dispensing a finished beverage by dispensing water and the beverage concentrate.

In a particular embodiment, the method further includes receiving the beverage concentrate in a receptacle before dispensing. In another embodiment, the method includes hermetically sealing the receptacle after receiving the beverage concentrate. In another embodiment, the method includes disabling brewing if the receptacle is not present.

In one embodiment, the beverage concentrate is brewed at a temperature of at least about 180° F. In a particular embodiment, the heat exchanger reduces the temperature of the beverage concentrate to less than about 120° F.

In another embodiment, the beverage concentrate is brewed to a concentration such that a finished beverage is produced by combining about four parts of water to about one part of beverage concentrate.

Important technical advantages are provided herein, including, without limitation, local production of a beverage concentrate that has a relatively long shelf life and which can be made quickly. Also, the provision of heat exchanging allows for immediate use of the concentrate.

BRIEF DESCRIPTION OF THE DRAWINGS

Reference is made in the description to the following briefly described drawings, wherein like reference numerals refer to corresponding elements:

FIG. 2 is a schematic illustration of a pump, sold out-device, and heat exchanger unit according to one aspect of the teachings of the present invention;

FIG. 3 is a perspective illustration of the unit of FIG. 2;

FIG. 4 is a side view of the unit of FIG. 2;

FIGS. 5 and 6 are top and bottom views, respectively, of the unit of FIG. 2.

DETAILED DESCRIPTION OF THE INVENTION

Figure 1:
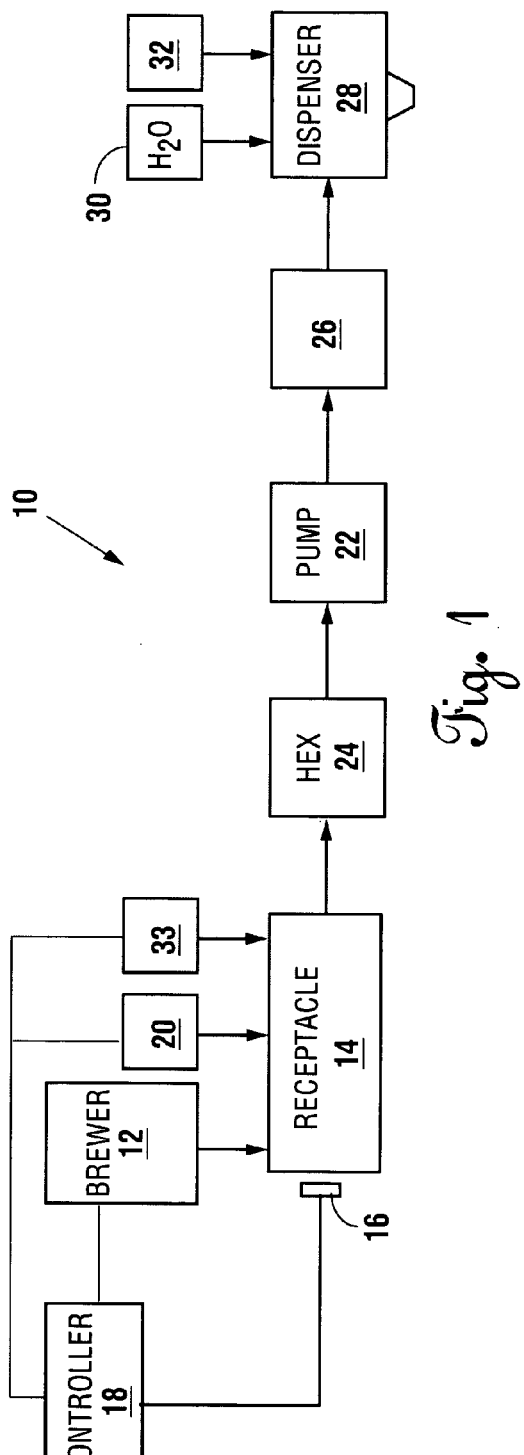
FIG. 1 is a block diagram of a beverage production system according to one aspect of the teachings of the present invention.

FIG. 1 is a block diagram of a beverage production system 10 according to one aspect of the teachings of the present invention. As shown, system 10 includes a brewer 12 that brews beverage concentrate. In a preferred embodiment, the beverage concentrate is a tea concentrate. However, other concentrates, such as, without limitation, coffee concentrates, may also be brewed. The system 10 (and the corresponding method of production) is located (or performed) at a single facility (such as, without limitation, a restaurant or convenience store).

In one particular example, the concentrate is brewed to a concentration such that a finished beverage is produced by combining about four parts of water to about one part of beverage concentrate. However, this example is without limitation, and any suitable concentration may be used.

In a preferred embodiment, the beverage concentrate is brewed at a temperature of at least about 180° F. Brewing at this temperature kills most biological contaminants, thus allowing the beverage concentrate, if handled properly, to enjoy a relatively long shelf life. However, this example is without limitation, and any suitable brewing temperature may be used.

In a particular embodiment, the brewed beverage concentrate is received into receptacle 14. Receptacle 14 is preferably an insulated container, although it need not be. Also, it is preferred that the receptacle 14 may be hermetically sealed, although it need not be. Hermetic sealing lengthens the shelf life of the beverage concentrate. As an example of sealing, the receptacle 14 may be sealed after receiving the brewed beverage concentrate, without limitation, by latching closed a hermetically sealing cover to the receptacle 14. In another embodiment, the receptacle 14 may be coupled to the brewer as part of a closed brewing system in which brewed beverage concentrate flows into the receptacle through a passageway that is closed to the open environment. Receptacle 14 may be designed to allow it to be moved away from brewer 12 to allow another receptacle to be filled. For example, and without limitation, receptacle 14 may include rollers or be placed on a cart, and may include handles to facilitate handling.

A sensor 16 may be provided to sense the presence of receptacle 14. Sensor 16 is coupled to controller 18. Controller 18 may be provided to disable brewing if the sensor 16 does not sense the presence of the receptacle 14. Any suitable sensor, including, without limitation, magnetic or Hall-effect sensors, may be used. Also, controller 18 may include a user interface, and may perform various other functions, including, without limitation, controlling brewer 12, automatically turning the brewer 12 off for power savings, and automatically brewing at set times.

An injector 20 may also be provided to inject sweeteners or flavors into the beverage concentrate in receptacle 14. A plurality of injectors 20 may be provided, one for each sweetener or each flavor. Also, controller 18 may be used to control the injection of flavors or sweeteners. The injectors 20 may be configured to inject sweeteners or flavors at any suitable location, for example, and without limitation, at or just after the brewer 12, anywhere along the flow stream of the beverage concentrate, into the receptacle 14, or at the dispensing location.

In a preferred embodiment, a pump 22 pumps the beverage concentrate from the receptacle 14 through a heat exchanger (also referred to as a thermal compensator) 24. However, heat exchanger is 24 is not required. In a preferred embodiment, heat exchanger 24 is operable to reduce the temperature of beverage concentrate from about 180° F. to about 120° F. This example is without limitation, and any suitable temperatures may be used. Pump 22 may be any suitable pump, including, without limitation, a $CO_2$-driven demand pump or an electric pump. Furthermore, pump 22 may be located downstream or upstream of the heat exchanger 24 (in either case, it is said to pump the beverage concentrate through the heat exchanger 24). The concentrate flows through suitable lines, such as, without limitation, plastic beverage tubing. Also, inlet water used in brewing the beverage concentrate may be passed through lines that are in heat exchanging communication with heat exchanger 24 before flowing into brewer 12. Such a configuration helps dissipate heat from the brewed concentrate (at heat exchanger 24) and raises the temperature of the inlet water for brewing, thus reducing energy costs associated with raising inlet water temperature during brewing.

In another embodiment, no receptacle 14 is necessary, and the brewed beverage concentrate is transferred directly to the heat exchanger 24. This transfer may be accomplished by any appropriate approach, including, without limitation, pumping or gravity feed. In still another embodiment, receptacle 14 may be located downstream of the heat exchanger 14 (i.e., between the heat exchanger 14 and the dispenser 28 (discussed below)). In this latter example, the brewed beverage concentrate is transferred to the heat exchanger by any appropriate approach, including, without limitation, pumping or gravity feed. The beverage concentrate is transferred from the receptacle to the dispenser 28 by any appropriate approach, including, without limitation, pumping.

An out-of-product (or "sold out") device 26 may be provided, if desired, to prevent dispensing when the receptacle 14 is empty or nearly empty. Sold out device 26 may be a flow or pressure sensor type device that closes a valve upon sensing low flow or pressure, or any other suitable device. As another example, and without limitation, a liquid level sensor may be used to disable pump 22 upon detection of a low concentrate level in receptacle 14.

After flowing through heat exchanger 24, beverage concentrate flows to a dispenser 28, which may be, without limitation, a post-mix dispenser. Preferably pump 22 is used to pump the beverage concentrate to the dispenser 28; however, any suitable approach may be used. Dispenser 28 is also coupled to a water source 30. Dispenser 28 may also be coupled to a source of sweetener or flavor sources (represented by block 32). Upon activation by a user, such as, without limitation, be pressing an activation lever with a cup or pitcher or other container, or by pressing an activation button or switch, dispenser 28 dispenses appropriate portions of water (and sweetener or flavors if provided or desired) and concentrate for forming a finished beverage. The water and concentrate are typically dispensed through a dispensing nozzle. The correct water to concentrate ratio is controlled by the dispenser 28, typically through the use of valves, although any suitable approach may be used, including, without limitation, metered pumping.

Furthermore, an automatic sanitizing system may also be provided. In particular, a sanitizing injector 33 provides a source of sanitizing solution for injection into receptacle 14. The solution is pumped through the entire system for sanitizing. The sanitizing may be automatic or manual, or controlled through the controller 18.

FIGS. 2-6 show various views of a unit, preferably wall-mounted, that includes the pump 22, heat exchanger 24, and out-of-product device 26. The particular embodiment shown is a dual system (for example, and without limitation, for both sweet and unsweet tea), and thus there are two pumps 22, two heat exchangers 24, and two out-of-product devices 26. Also shown is a regulator for regulating $CO_2$ pressure to pumps 22, as the particular embodiment shown employs $CO_2$ driven pumps. Also shown is an overflow cup 36 for capturing overflow from out-of-product devices 26. Beverage tubing, not shown, interconnects the components.

As best shown in FIGS. 3-6, heat exchanger 24 may be a fin-type heat exchanger, which comprises turns of stainless steel (or other suitable conductive material) tubing 38 through which concentrate flows and heat dissipating fins 40 conductively coupled to the tubing 38. In one particular non-limiting example, the fins are made of conductive metal, such as aluminum, and are 4 inches wide by 48 inches long, with a groove in the middle into which tubing 38 is clamped. Heat is dissipated through the fins 40 to the ambient air. Fans may also be used instead of or in conjunction with the fins 40. Although a fin-type heat exchanger is illustrated, any suitable heat exchanger may be used.

Figure 7:
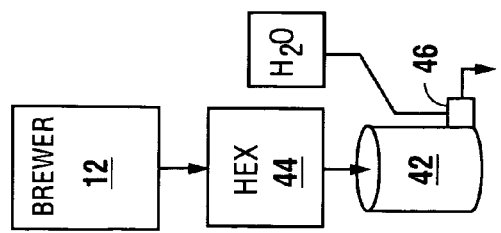
FIG. 7 is a block diagram of a beverage production system according to one aspect of the teachings of the present invention.

In another embodiment, shown in FIG. 7, brewed concentrate is brewed into a receptacle 42, such as, without limitation, a tea urn. The brewed concentrate preferably passes through a heat exchanger 44, although the heat exchanger 44 is not required. Finished strength beverages are dispensed (either at the receptacle 42 or remotely at a dispenser) by mixing the beverage concentrate with water upon dispensing. Upon activation by a user, water valve 46 opens allowing water to be dispensed. Beverage concentrate is dispensed for mixing with the water in any appropriate way. For example, and without limitation, the beverage concentrate may flow by gravity or pumping through its own valve, or the water valve 46 may be a venturi valve that draws the beverage concentrate into the water stream.

Within this description, coupling includes both direct coupling of elements, and coupling indirectly through intermediate elements. Also, although brewing is the preferred method of producing the beverage concentrate, it may be produced in any conventional way, including, without limitation, steeping, with hot or cold water.

The particular embodiments and descriptions provided herein are illustrative examples only, and features and advantages of each example may be interchanged with, or added to the features and advantages in the other embodiments and examples herein. Moreover, as examples, they are meant to be without limitation as to other possible embodiments, are not meant to limit the scope of the present invention to any particular described detail, and the scope of the invention is meant to be broader than any example. Also, the present invention has several aspects, as described above, and they may stand alone, or be combined with some or all of the other aspects.

And, in general, although the present invention has been described in detail, it should be understood that various changes, alterations, substitutions, additions and modifications can be made without departing from the intended scope of the invention, as defined in the following claims.

What is claimed is:

1. A tea production system, comprising:
   a brewer operating in ambient air, the brewer operable to brew a tea concentrate at a temperature above that of the ambient air;
   a heat exchanger operable to cool the tea concentrate by removing at least some heat imparted during brewing;
   a pump operable to pump the tea concentrate through the heat exchanger wherein the pump is downstream of the brewer; and
   a dispenser operable to dispense and cause the mixing of both water from a water source and the tea concentrate that has been pumped through the heat exchanger to form a finished beverage;
   wherein the brewer, the heat exchanger, the pump, and the dispenser are all located at a single facility.

2. The system of claim 1, and further comprising a receptacle in fluid communication with the brewer and operable to receive the tea concentrate.

3. The system of claim 2, wherein the receptacle is upstream of the heat exchanger.

4. The system of claim 2, wherein the receptacle is downstream of the heat exchanger.

5. The system of claim 2, and further comprising a hermetic seal for hermetically sealing the receptacle after receiving the tea concentrate.

6. The system of claim 2, and further comprising:
   a sensor operable to sense the presence of the receptacle; and
   circuitry operable to disable the brewer in response to the sensor not sensing the presence of the receptacle.

7. The system of claim 1, wherein the brewer brews the tea concentrate at a temperature of at least about 180° Fahrenheit.

8. The system of claim 1, wherein the heat exchanger reduces the temperature of the tea concentrate to less than about 120° Fahrenheit.

9. The system of claim 1, and further comprising a sensor operable to sense an out of product condition with respect to the tea concentrate and cause the pump to be disabled.

10. The system of claim 1, wherein the tea concentrate is brewed to a concentration such that a finished beverage is produced by combining about four parts of water to about one part of tea concentrate.

11. The system of claim 1, and further comprising a sweetener injector operable to add sweetener to the tea concentrate.

12. The system of claim 1, and further comprising a flavor injector operable to add flavor to the tea concentrate.

* * * * *